US010085544B2

(12) United States Patent
Schessel

(10) Patent No.: US 10,085,544 B2
(45) Date of Patent: Oct. 2, 2018

(54) CLIP AND METHOD FOR ATTACHING AN ITEM TO A STRAP WORN BY A PERSON

(71) Applicant: Larry Edward Schessel, Half Moon Bay, CA (US)

(72) Inventor: Larry Edward Schessel, Half Moon Bay, CA (US)

( * ) Notice: Subject to any disclaimer, the term of this patent is extended or adjusted under 35 U.S.C. 154(b) by 110 days.

(21) Appl. No.: 15/179,698

(22) Filed: Jun. 10, 2016

(65) Prior Publication Data
US 2016/0360871 A1    Dec. 15, 2016

Related U.S. Application Data

(60) Provisional application No. 62/242,879, filed on Oct. 16, 2015, provisional application No. 62/175,887, filed on Jun. 15, 2015.

(51) Int. Cl.
| | |
|---|---|
| *A45F 5/00* | (2006.01) |
| *F16B 2/10* | (2006.01) |
| *F16B 2/00* | (2006.01) |
| *A45C 13/30* | (2006.01) |
| *A45F 3/00* | (2006.01) |

(52) U.S. Cl.
CPC .............. *A45F 5/00* (2013.01); *F16B 2/005* (2013.01); *F16B 2/10* (2013.01); *A45C 2013/306* (2013.01); *A45F 2003/001* (2013.01); *A45F 2200/0583* (2013.01)

(58) Field of Classification Search
CPC .............. A45F 5/00; A45F 2003/001; A45F 2200/0583; F16B 2/005; F16B 2/10; A45C 2013/306
See application file for complete search history.

(56) References Cited

U.S. PATENT DOCUMENTS

| | | | | |
|---|---|---|---|---|
| 3,604,071 A | * | 9/1971 | Reimels ................. | A61B 17/30 24/543 |
| 3,956,805 A | | 5/1976 | Stroh | |
| 4,038,726 A | * | 8/1977 | Takabayashi ......... | A44B 11/06 24/169 |
| 4,387,489 A | | 6/1983 | Dudek | |

(Continued)

OTHER PUBLICATIONS

Amazon.com: OP/TECH USA System Connector—Reporter/Backpack: Camera and Optics Carrying Straps: Camera & Photo, Mar. 11, 2015, http://www.amazon.com/OP-TECH-USA-System-Connector/dp/B0010HA681, 6 pages.

*Primary Examiner* — Corey Skurdal
(74) *Attorney, Agent, or Firm* — Haynes Beffel & Wolfeld LLP; James F. Hann; Andrew L. Dunlap

(57) ABSTRACT

A clip attaches an item, including a weight bearing item, to a strap worn by a person. The clip includes a body and a closure mechanism. The body has bottom and top portions connected by a hinge movable between a closed position, to capture the strap between, and an open position. At least one of the top and bottom surfaces has strap-engaging, non-slip structure to securely engage the strap captured therebetween. The closure mechanism includes closure structure at closure ends of the top and bottom portions and a stabilizer preventing relative movement of the closure ends generally parallel to the hinge axis when the clip is in the closed position. The clip can include a fastener supported by the body, the fastener being configured for attachment of the item to the clip.

23 Claims, 15 Drawing Sheets

(56) References Cited

U.S. PATENT DOCUMENTS

| | | | | |
|---|---|---|---|---|
| 4,623,102 A | * | 11/1986 | Hough, Jr. | F16L 3/1236 |
| | | | | 24/543 |
| 4,847,956 A | * | 7/1989 | Levine | B65D 33/1675 |
| | | | | 24/30.5 R |
| 4,883,290 A | | 11/1989 | Landa | |
| 5,941,434 A | * | 8/1999 | Green | A45F 5/02 |
| | | | | 224/195 |
| 5,956,812 A | | 9/1999 | Moennig | |
| 6,786,372 B2 | | 9/2004 | Enkerlin et al. | |
| 7,181,806 B2 | * | 2/2007 | Folkmar | B65D 33/1675 |
| | | | | 24/30.5 R |
| 7,328,486 B2 | | 2/2008 | Farchione | |
| 7,828,180 B2 | | 11/2010 | Slesar | |
| 7,850,302 B1 | | 12/2010 | Riazi | |
| 8,166,615 B2 | | 5/2012 | Coldiron | |
| 8,800,941 B2 | | 8/2014 | Kahn | |
| 9,833,606 B2 | | 12/2017 | Calderon et al. | |
| 2007/0095991 A1 | | 5/2007 | Fall | |
| 2007/0220717 A1 | | 9/2007 | Brinson | |
| 2007/0278270 A1 | | 12/2007 | Castaneda | |
| 2010/0115739 A1 | * | 5/2010 | Mathur | A45F 5/02 |
| | | | | 24/306 |
| 2011/0210215 A1 | | 9/2011 | Nitsche et al. | |
| 2013/0212898 A1 | | 8/2013 | Reynolds | |

* cited by examiner

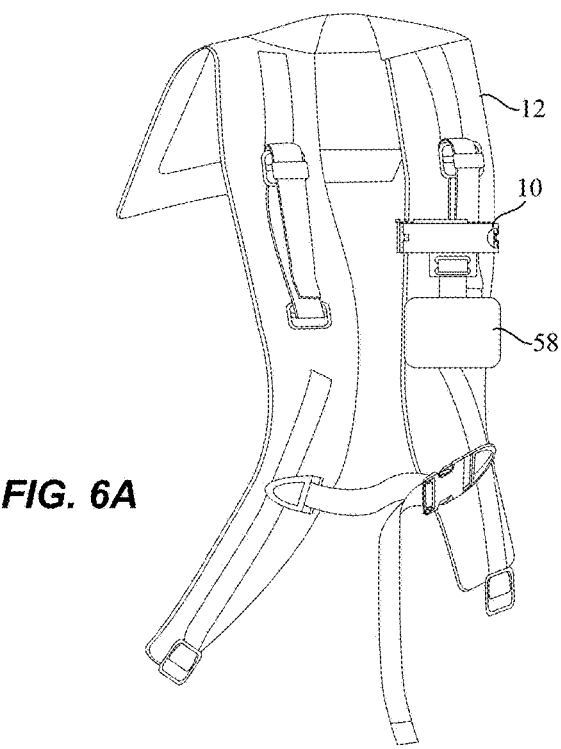
*FIG. 6A*
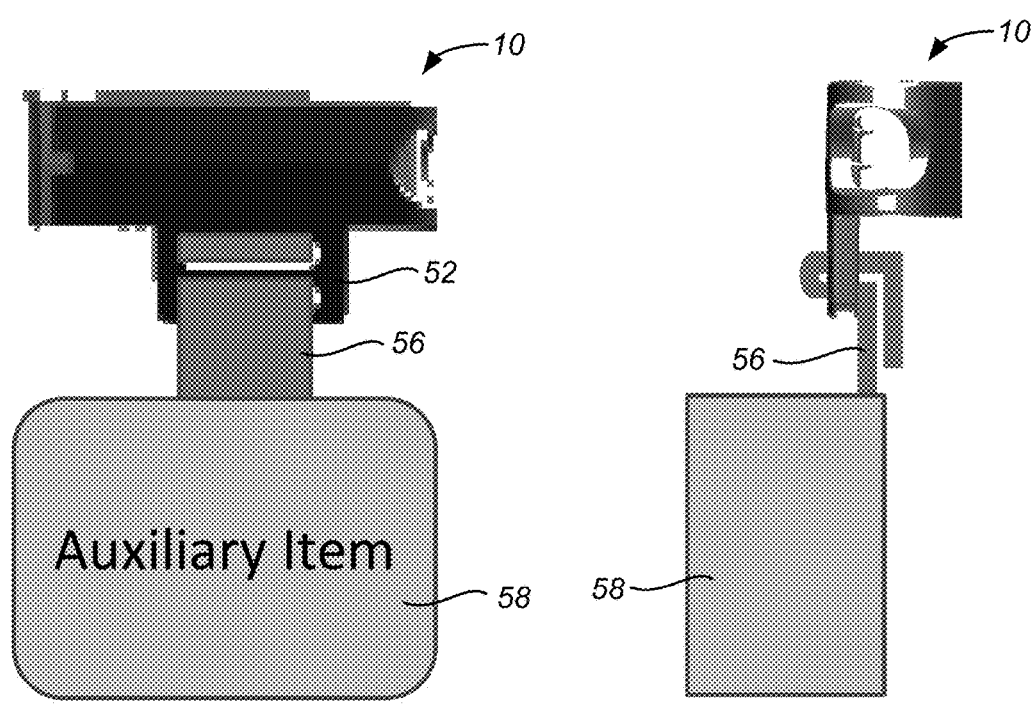
*FIG. 6B*  *FIG. 6C*

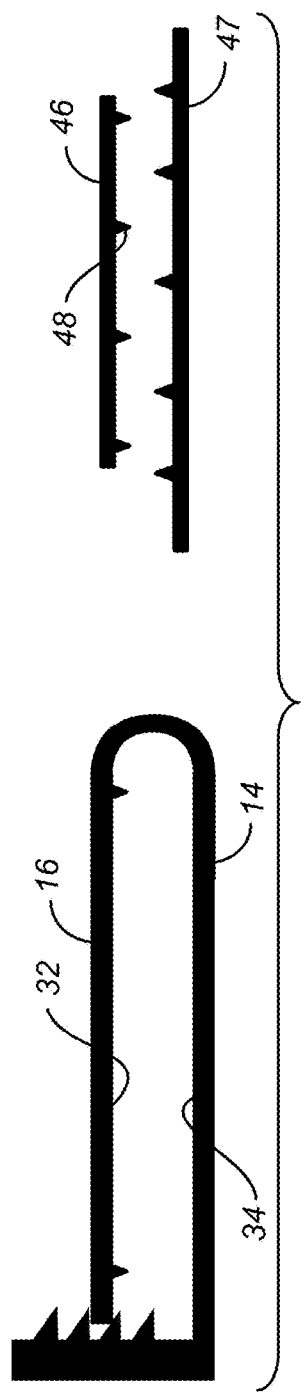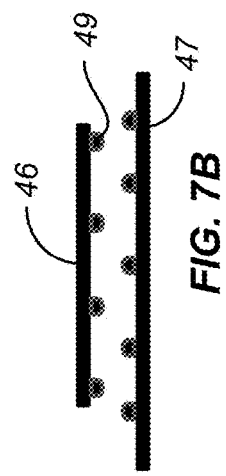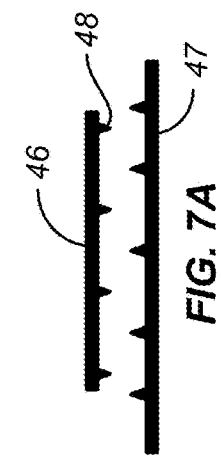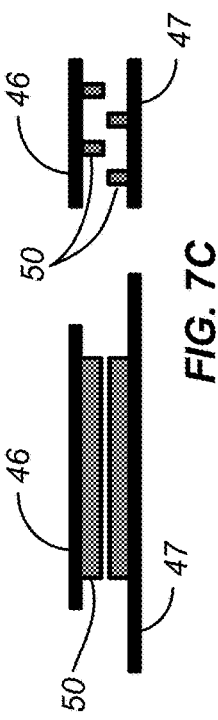

CLIP AND METHOD FOR ATTACHING AN ITEM TO A STRAP WORN BY A PERSON

CROSS-REFERENCE TO OTHER APPLICATIONS

This application claims the benefit of US provisional patent application No. 62/175,887, filed 15 Jun. 2015, entitled Clip for Attaching Auxiliary Weight Bearing Items to Shoulder Strap and US provisional patent application No. 62/242,879, filed 16 Oct. 2015, entitled Clip for Attaching Auxiliary Weight Bearing Items to Shoulder Strap.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

The embodiments described herein relate generally to transportation of items, and more particularly, to a clip for attaching auxiliary weight bearing items to a strap.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves may also correspond to implementations of the claimed technology.

People wear items with shoulder straps for many reasons, such as carrying things (e.g., book bag, backpack, child carrier, purse, and the like) or back support or floatation (Personal Flotation Device) or emergency supplies or tactical supplies. Wearing heavy items with shoulder straps to one part or side of the body introduces several problems, such as uneven weight distribution which can lead to pain, too heavy a weight on one side of the body which can lead to balance issues, security risk if valuables are out of direct eyesight and difficulty accessing things within the carrier, for example, a map contained within a backpack is difficult to access unless the user removes the backpack.

Conventional devices exist to introduce auxiliary items to strap systems. However, most conventional devices and systems support only limited light-weight applications and/or tend to slip with higher weight. Some of the conventional devices allow a user to attach items, but the added weight adds unexpected vertical and horizontal tensions to the existing strap, causing further complications, such as extensive strap wear or imbalance. Some of the conventional devices allow a user to attach items, but only in fixed locations along the strapping system. Yet further conventional devices may work for attaching auxiliary items, but are specific to one type of strapping system and are not interchangeable among different strapping systems.

Therefore, what is needed is a device for easily attaching auxiliary items to any strapping system, wherein the device provides for improved weight distribution, heavier weight applications, flexible positioning along the strapping system, and improved balance compared to conventional devices.

SUMMARY OF THE DISCLOSURE

A simplified summary is provided herein to help enable a basic or general understanding of various aspects of exemplary, non-limiting implementations that follow in the more detailed description and the accompanying drawings. This summary is not intended, however, as an extensive or exhaustive overview. Instead, the sole purpose of this summary is to present some concepts related to some exemplary non-limiting implementations in a simplified form as a prelude to the more detailed description of the various implementations that follow.

A first example of a clip is used to attach an item to a strap worn by a person. The clip includes a body and a closure mechanism. The body has a bottom portion having a bottom hinge end and a bottom closure end, a top portion having a top hinge end and a top closure end, and a hinge portion at the bottom and top hinge ends hingedly connecting the top and bottom portions for movement of the top and bottom portions about a hinge axis. The clip is placeable in a closed position with the top and bottom portions directly opposite one another, and in an open position with the top portion extending away from the bottom portion. The bottom portion has a bottom surface and the top portion has a top surface positioned opposite the bottom surface when the clip is in the closed position. At least one of the top and bottom surfaces comprising strap-engaging, non-slip structure. The top and bottom surfaces define an interior space when the clip is in the closed position. The interior space is configured to accommodate a user-wearable strap positionable between the bottom and top surfaces when the clip is in the closed position with the strap-engaging, non-slip structure engageable with the strap so that the clip is securable to the strap by the engagement of the strap-engaging, non-slip structure with the strap. The closure mechanism includes a first closure portion carried by the bottom portion and a second closure portion carried by the top portion. The closure mechanism is configured to secure the top portion to the bottom portion when the clip is in the closed position. The closure mechanism includes a stabilizer preventing movement generally parallel to the hinge axis of the first lock portion relative to the second lock portion when the clip is in the closed position.

Examples of the clip can include one or more the following. The hinge axis can be a fixed position hinge axis. The hinge portion can include a living hinge with the hinge axis being a living hinge axis defined by the living hinge. The clip can include a fastener supported by the body, the fastener being configured for attachment of the item to the clip. The fastener can be configured for attachment of a weight bearing item to the clip. The fastener can include a slotted webbing-attachment type fastener extending vertically from a chosen one of the top and bottom portions. The strap-engaging, non-slip structure can include at least one tooth. When the strap-engaging, non-slip structure includes a plurality of teeth, the plurality of teeth can be removably mountable to at least one of the top and bottom surfaces. The first closure portion can include a locking arm, extending from the bottom closure end away from the bottom surface, and the body and the locking arm and the closure mechanism can be constructed of a one piece, continuous length of material. The top portion can include a raised edge extending from the top surface at the top closure end, the raised edge extending parallel to the hinge axis.

In some examples the first closure portion can include a locking arm, extending from the bottom closure end away from the bottom surface. At least one locking arm tooth can extend from the locking arm towards the bottom hinge end, the at least one locking arm tooth having a tooth engagement surface facing the bottom surface of the bottom portion. The second closure portion can include a tooth engagement edge at the top closure configured to engage the tooth engagement surface of the at least one locking arm tooth. The stabilizer can include a stabilizer extension extending from a chosen one of the top closure end of the top portion and the locking arm, and a stabilizer groove formed in the other of the top closure end of the top portion and the locking arm.

A method for attaching an item to a strap to be worn by a person can be carried out as follows. A strap is positioned between the top and bottom portions of the first example of the clip. The clip is placed in the closed position so that the strap-engaging, non-slip structure engages the strap and the closure mechanism secures the bottom and top portions to one another. The item is secured to the clip. The strap is worn by a person with the item secured to the clip so that the item is at least partially supported by the strap through the clip.

Examples of the method can include one or more the following. The securing step can comprise securing the item to a fastener supported by the body, the fastener configured for attachment of the item thereto. The securing step can also include securing webbing extending from a weight bearing item to a slotted webbing-attachment type fastener extending from a chosen one of the top and bottom portions. The positioning step can comprise accessing a shoulder strap extending over the chest of a user.

Another method for attaching a weight bearing item to first and second straps to be worn by a person can be carried out as follows. The first strap can be position between the top and bottom portions of the first example of the clip. The first clip can be placed in the closed position so that the strap-engaging, non-slip structure engages the first strap and the closure mechanism secures the bottom and top portions to one another. The weight bearing item can be secured to the first clip. The second strap can be positioned between the top and bottom portions of the first example of the clip. The second clip can be placed in the closed position so that the strap-engaging, non-slip structure engages the second strap and the closure mechanism secures the bottom and top portions to one another. The weight bearing item can be secured to the second clip. The first and second straps can be worn by a person with the weight bearing item secured to the first and second clips so that the weight bearing item is at least partially supported by the first and second straps through the first and second clips.

Some embodiments of the present disclosure include a clip for attaching an auxiliary weight bearing items to a strap. The clip may include a bottom portion hingeably attached to a top portion, wherein the clip is configured to be in an open or closed position, an interior space created by the closure of the top portion and the bottom portion, the interior space configured to accommodate a strap or straps, a securement and lock mechanism that secures the top portion to the bottom portion, wherein the clip remains in a closed position and the top portion remains secure when weight is added to the clip, a plurality of teeth positioned on an interior surface of the clip, wherein the plurality of teeth are configured to engage with the strap(s), and a fastener extending from an exterior of the clip, the fastener configured to engage with the auxiliary item(s).

In another embodiment, the clip is a single folded material that consists of top portion, bottom portion and flexible connection between the top portion and bottom portion that is configured to be biased in a partially open position but possible to flex to a more open position as to allow a shoulder strap to be placed between the top portion and bottom portion or flex to a closed position, where an interior space is created by the closure of the top portion and the bottom portion, the interior space configured to accommodate straps, a securement and lock mechanism that secures the top portion to the bottom portion, wherein the clip remains in a closed position and the top portion remains secure when weight is added to the clip, a plurality of teeth positioned on an interior surface of the clip, wherein the plurality of teeth are configured to engage with the straps, and a fastener extending from an exterior of the clip, the fastener configured to engage with the auxiliary item either directly or indirectly using webbing or other similar material.

In general, in one embodiment, a clip for attaching auxiliary weight bearing items to a strap or straps, the clip including a bottom portion hingeably attached to a top portion, wherein the clip is configured to be in an open or closed position; an interior space created by the closure of the top portion and the bottom portion, the interior space configured to accommodate a strap or straps; a plurality of teeth positioned on an interior surface of the clip, wherein the plurality of teeth are configured to engage with the strap(s), causing friction; and a securement and lock mechanism configured to secure the top portion to the bottom portion. In some examples the plurality of teeth can be replaced by a single tooth; a single tooth extending from one of the interior surfaces of the clip may be constructed to engage in recess created in the other of the interior surfaces of the clip. While in general a plurality of teeth are preferred to provide the desired holding force, depending upon the expected weight of the object and the materials used for the strap, other types of strap-engaging, non-slip structure, such as a high friction surface made of, for example, rubberlike material or sandpaper type material or a surface constructed similar to that found on a file, can be used.

In general, in one embodiment, a clip for attaching auxiliary weight bearing items to a strap, the clip including a single folded material with a top portion, bottom portion and one or more flexible connections between the top portion and bottom portion, wherein the folded material is biased in a partially open position but possible to flex to a more open position or flex to a closed positions; an interior space created by the closure of the top portion and the bottom portion, the interior space configured to accommodate a strap or straps; a plurality of teeth positioned on an interior surface of the clip, wherein the plurality of teeth are configured to engage with the strap(s) causing friction; and a securement and lock mechanism configured to secure the top portion to the bottom portion.

This and other embodiments can include one or more of the following features. The clip can attach an auxiliary weight bearing item to a strap and a fastener extending from an exterior of the clip top portion, the fastener can be configured to engage with the auxiliary item, either directly or indirectly using conventional connectors such as webbing. The fastener can include hooks, or any other conventional fastener, such as hook and loop fastener, snap(s), button(s), screw(s), tie(s), clip(s), carabineer(s) or the like. The clip can attach an auxiliary weight bearing item to a strap and the plurality of teeth on the interior surfaces of the clip can be configured in a specific way (e.g. offset rows), so as to optimize the friction when they come in contact with the strap and not slip along the length of the strap when the clip is in a closed position and weight is added to the clip. The clip can attach an auxiliary weight bearing item to a strap, the plurality of teeth on the interior surfaces of the clip can be grouped into teeth that are raised and others that are even with the clip top portion interior wall. The clip can attach an auxiliary weight bearing item to a strap, the plurality of teeth on the interior surfaces of the clip can be a separate component from the clip top and bottom interior walls, pluggable into the interior walls and interchangeable with one another to provide different combinations of friction-creating options depending upon the specific application. The clip can attach an auxiliary weight bearing item to a strap, the plurality of teeth on the interior surfaces of the clip can be one of many shapes, for example, sharp, dull, rounded, rectangular raised walls or any other shape. The clip can attach an auxiliary weight bearing item to a strap, the securement and lock mechanism can consist of multiple teeth to secure the clip top portion in multiple degrees of closure. The clip can attach an auxiliary weight bearing item to a strap, the fastener can include a slatted protrusion, the slats can be used to secure webbing from the auxiliary item or can include any other conventional fastener, such as hook, hook and loop fastener, snap(s), button(s), screw(s), tie(s), clip(s), carabineer(s) or the like. The clip can attach an auxiliary weight bearing item to a strap and a raised edge on the inner portion of the top of clip distal to the flexible connection that can be located between the clip top portion lock groove and the plurality of teeth. The clip can attach an auxiliary weight bearing item to a strap and a raised edge on the inner portion of the top of clip distal to the flexible connection that can be located between the clip top portion lock groove and the plurality of teeth.

The clip can attach an auxiliary weight bearing item to a strap and a thin soft cushion can attach to the outer side of the clip bottom portion for optional comfort. The clip can attach an auxiliary weight bearing item to a strap and any combination of the previously described embodiments.

Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Other features, aspects and advantages of technology disclosed can be seen on review the drawings, the detailed description, and the claims, which follow.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

Having thus described the invention in general terms, reference is now made to the accompanying FIGS. 1-18B, which show different views of different example embodiments of the clip as well as uses.

Figure 1A:
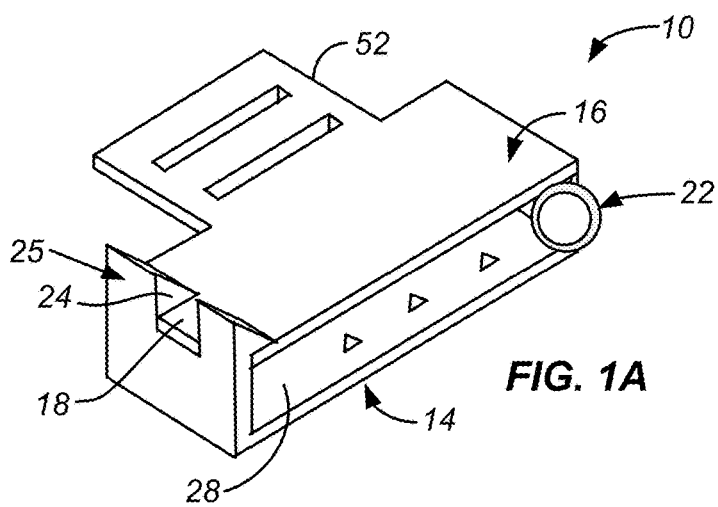
Figure 1B:
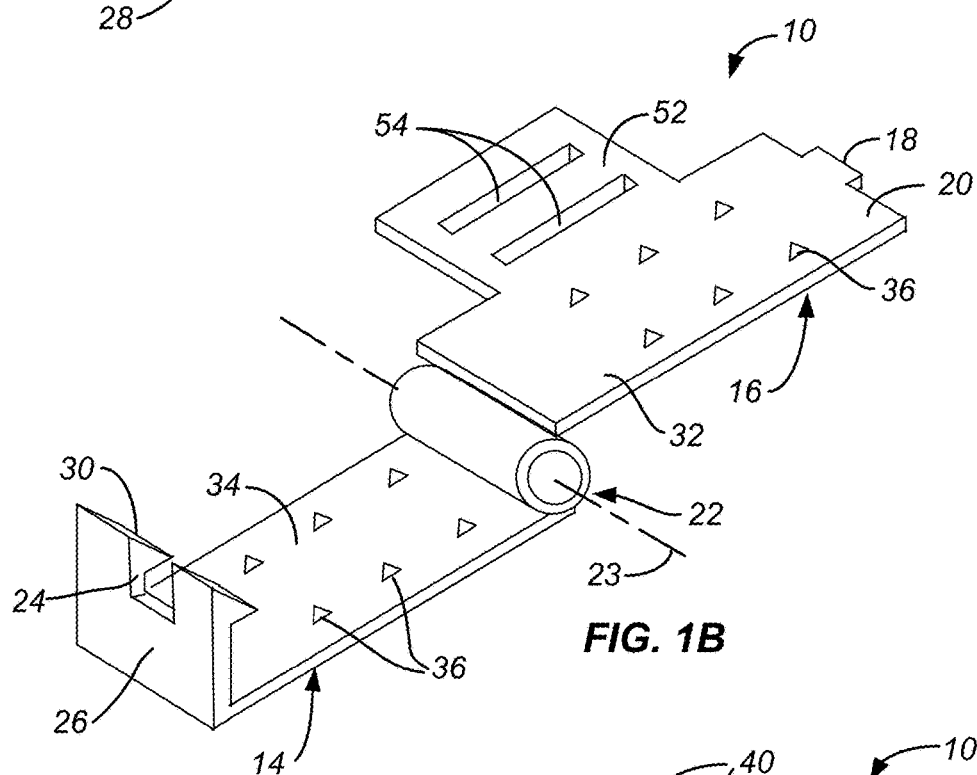

FIGS. 1A and 1B are isometric views of a first example of a clip having a bottom portion, a top portion, a hinge portion connecting the top and bottom portions, and a closure mechanism, shown in a closed position and an open position, respectively.

Figure 2:
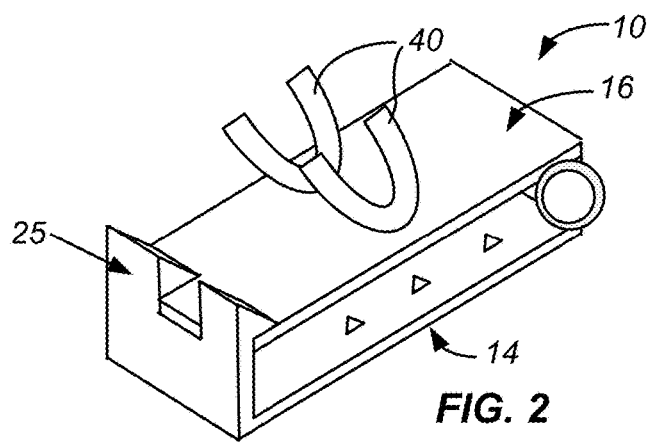

FIG. 2 is an isometric view of alternative example of the clip of FIG. 1A showing a pair of hook fasteners extending from the outer surface of the top portion.

Figure 3A:
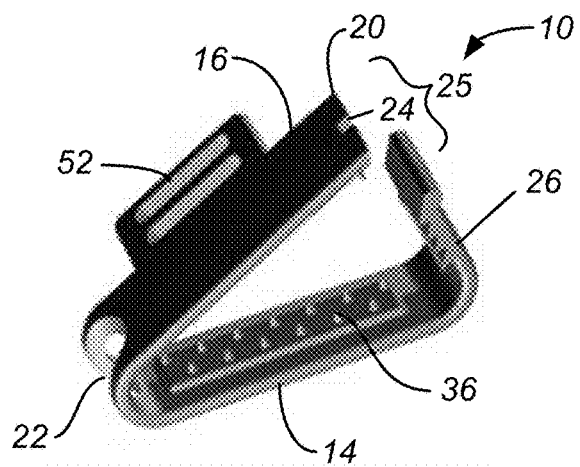
Figure 3B:
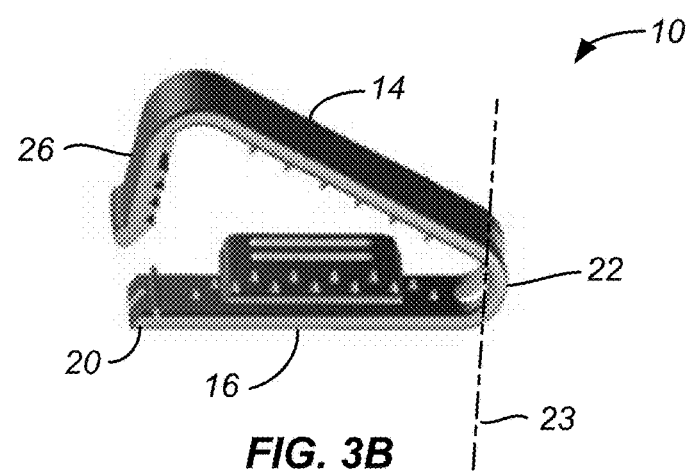
Figure 3C:
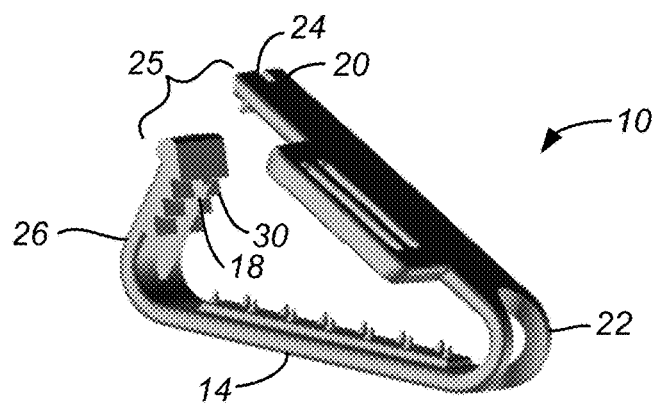

FIG. 3A, FIG. 3B, and FIG. 3C are isometric views of another example of a clip made of a single piece of molded material.

Figure 4:
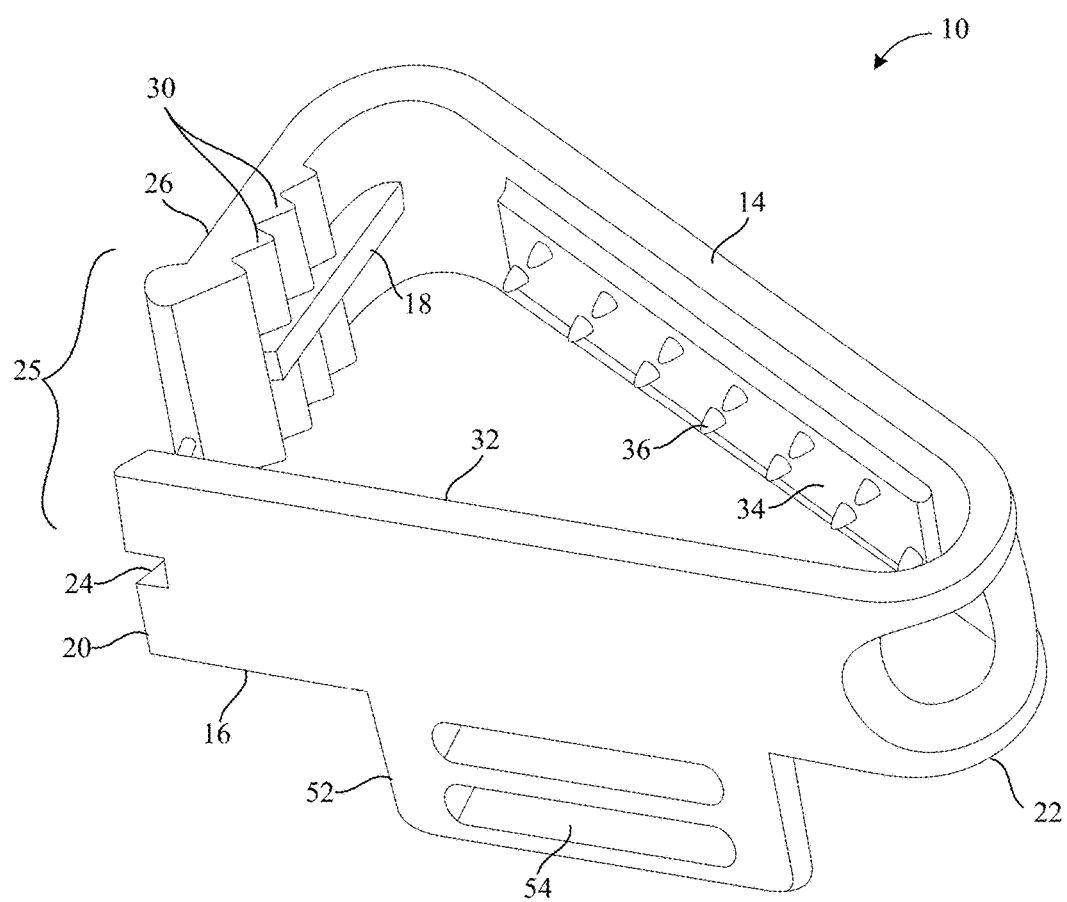

FIG. 4 is an enlarged view of the stabilizer of the example of FIGS. 3A-3C.

Figure 5A:
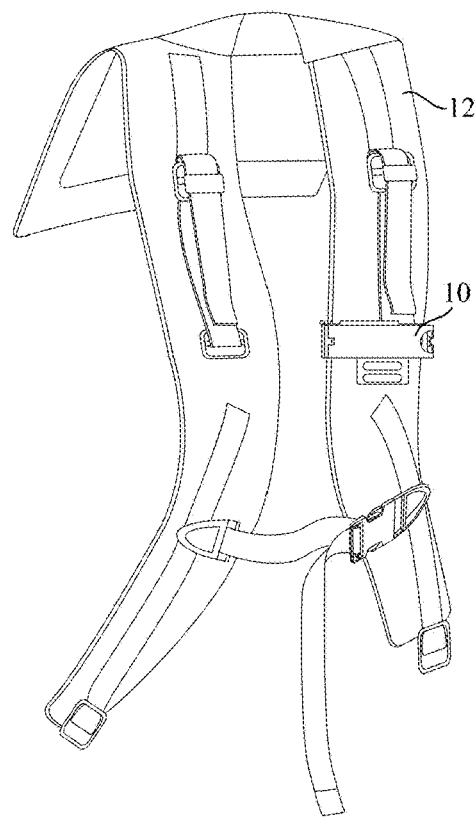

FIG. 5A is a simplified view of the clip of FIGS. 3A-3C shown mounted to a shoulder strap.

Figure 5B:
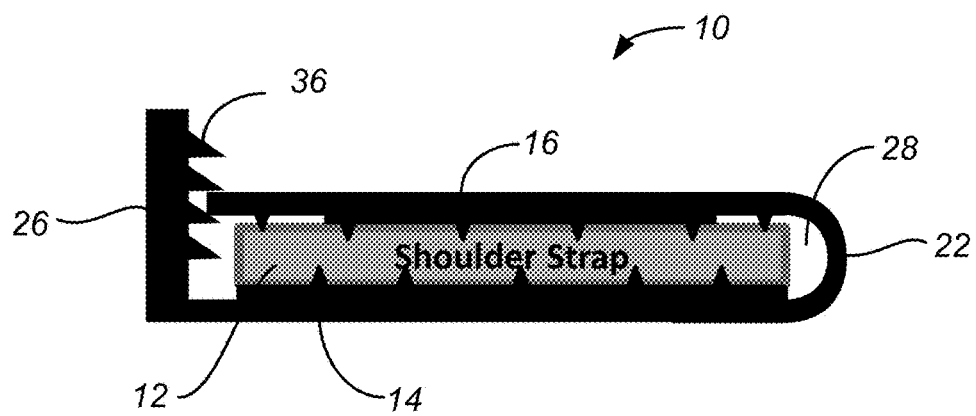

FIG. 5B is a cross-sectional view of the clip and shoulder strap of FIG. 5A.

FIG. 6A shows the structure of FIG. 5A with an auxiliary item supported by the slotted fastener of the clip.

FIG. 6B and FIG. 6C are simplified front and side views of the structure of FIG. 6A.

FIG. 7 illustrates another alternative example of a clip in which the teeth are part of the removable and replaceable strap-engaging teeth components.

FIG. 7A, FIG. 7B, and FIG. 7C show examples of different types of teeth.

Figure 8A:
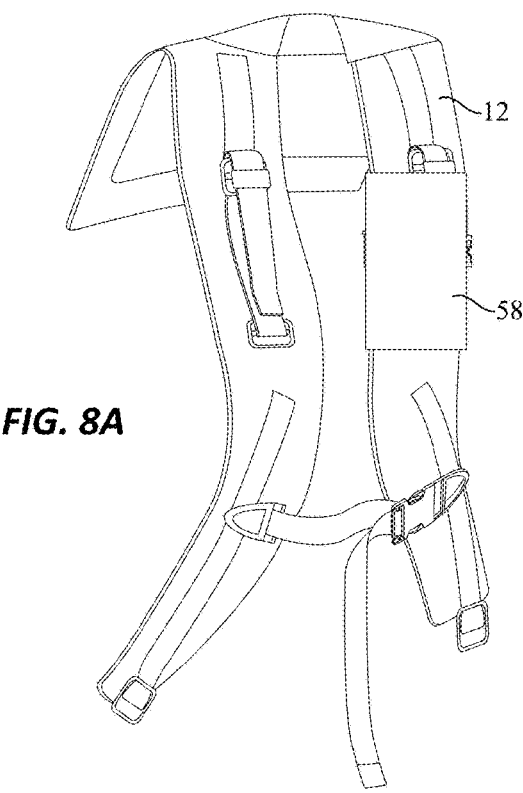

FIG. 8A illustrates how the clip can be used to add a generic weight bearing auxiliary pack back to a shoulder strap.

Figure 8B:
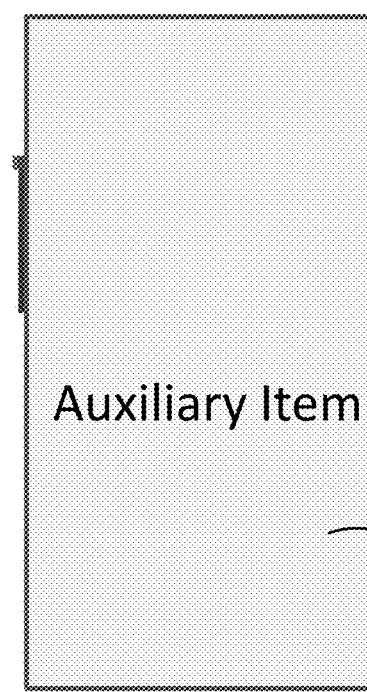

FIG. 8B is an enlarged view of the structure of FIG. 8A.

Figure 8C:
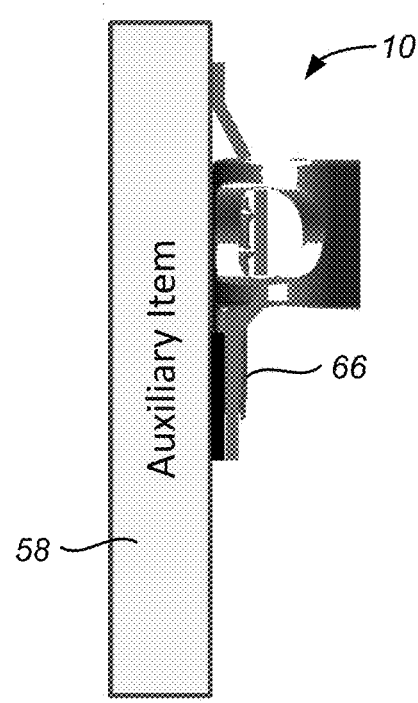

FIG. 8C is an enlarged side view of the structure of FIG. 8B.

Figure 9A:
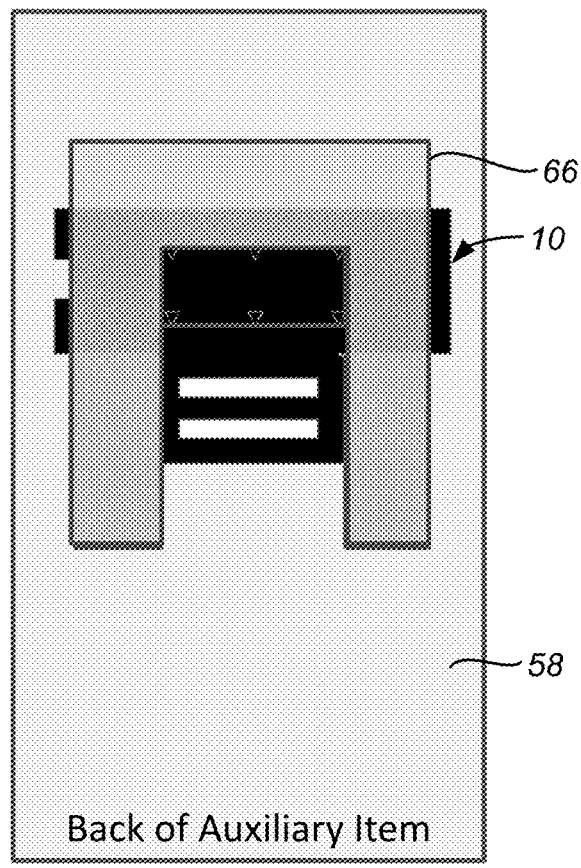

FIG. 9A is a back view showing the connection of the auxiliary item to the top clip portion of the clip of FIG. 3A using hook and loop fasteners.

Figure 9B:
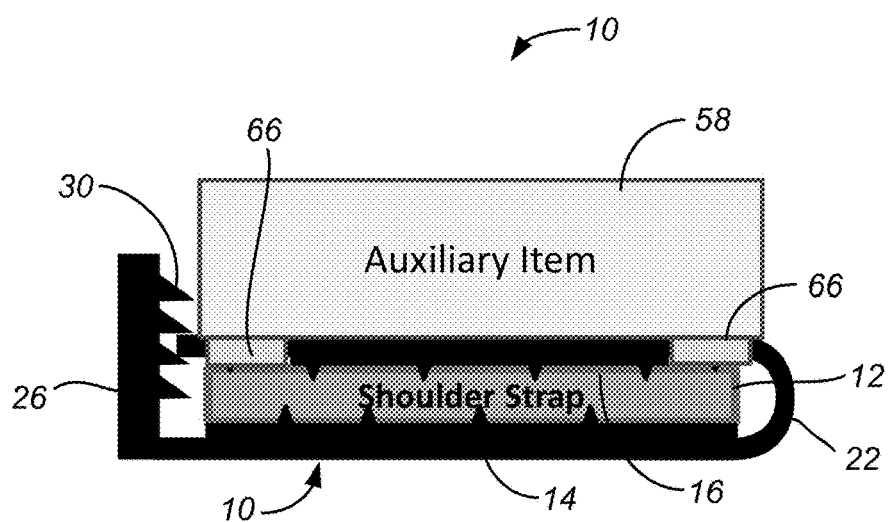

FIG. 9B is a cross-sectional view of the structure of FIG. 9A.

Figure 10:
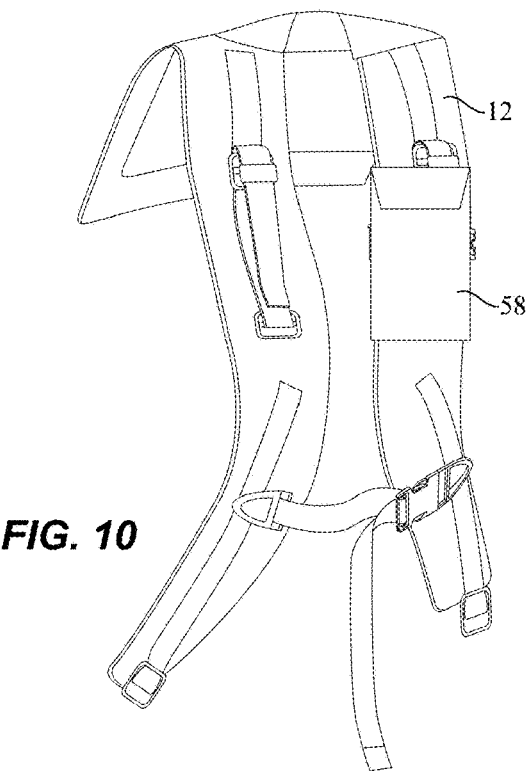

FIG. 10 shows the structure of FIG. 8A but with the auxiliary item, sized to hold smartphones, connected to the top clip portion by a hook and loop attachment system.

Figure 10A:
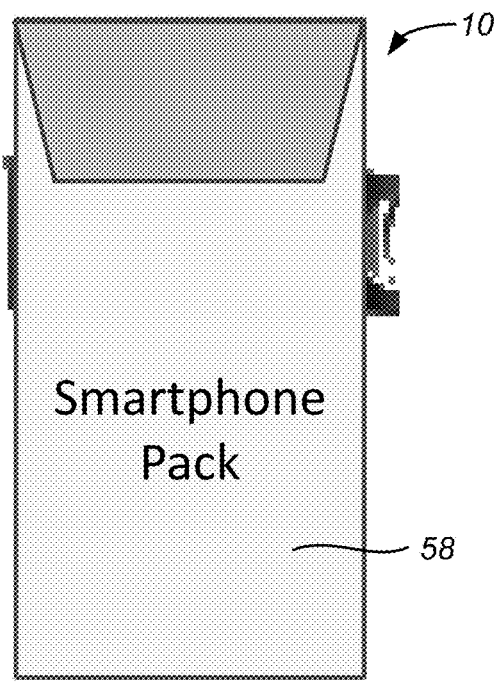

FIG. 10A is an enlarged front view of the structure of FIG. 10.

Figure 10B:
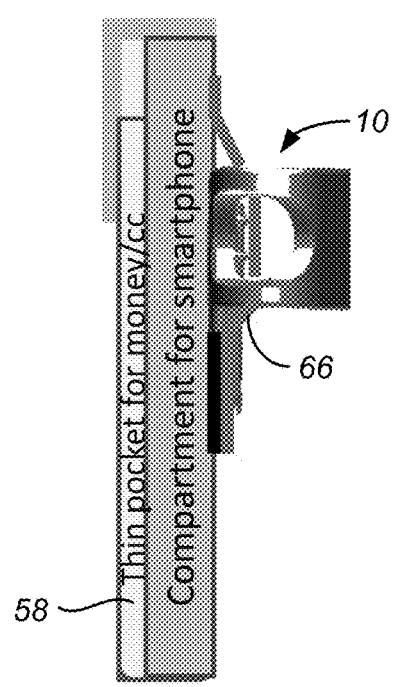

FIG. 10B is a side view of the structure of FIG. 10A with the strap removed for clarity.

Figures 11, 11A:
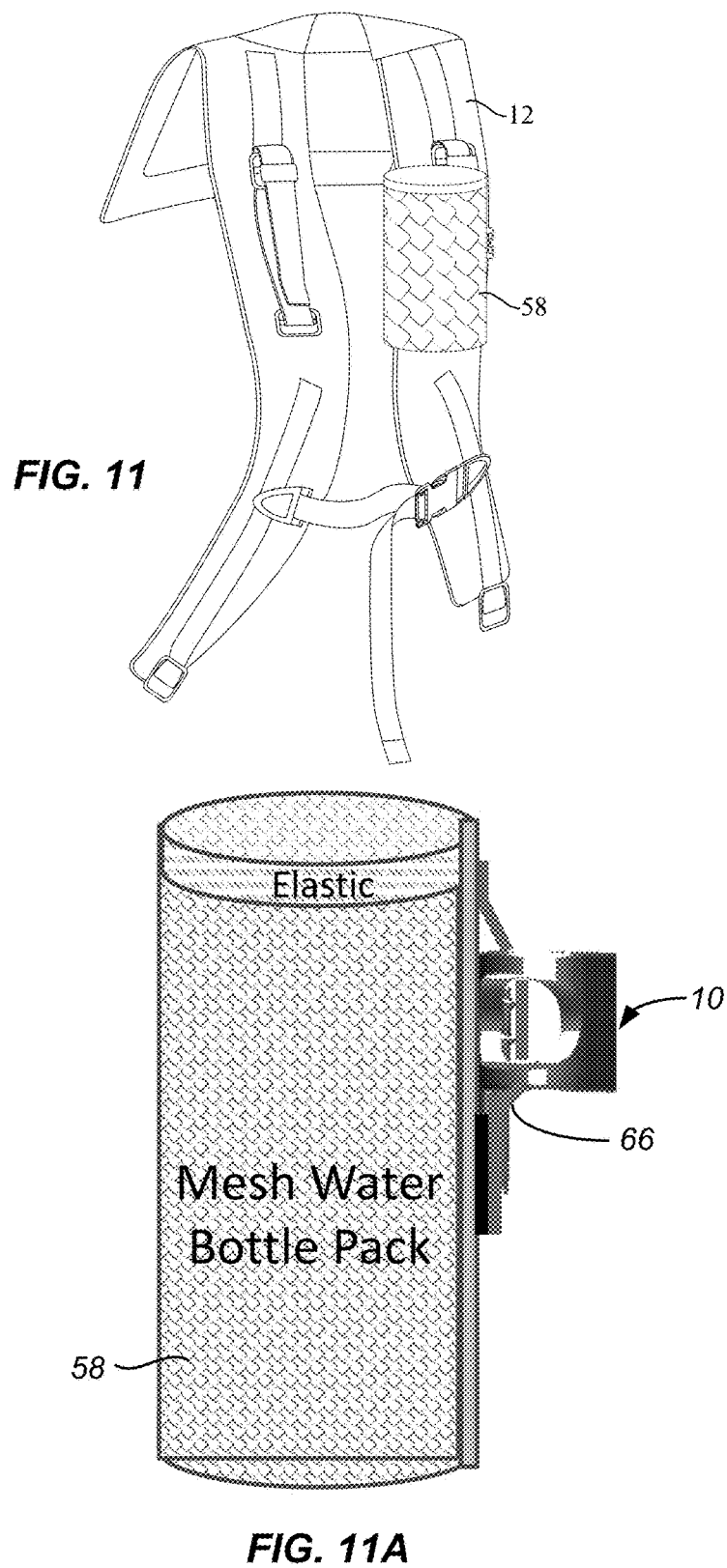

FIG. 11 shows the structure of FIG. 8A but with the auxiliary item in the form of a mesh structure sized to hold a water bottle, connected to the top clip portion by a hook and loop attachment system.

FIG. 11A is an enlarged side view of the structure of FIG. 11 with the strap removed for clarity.

Figure 12:
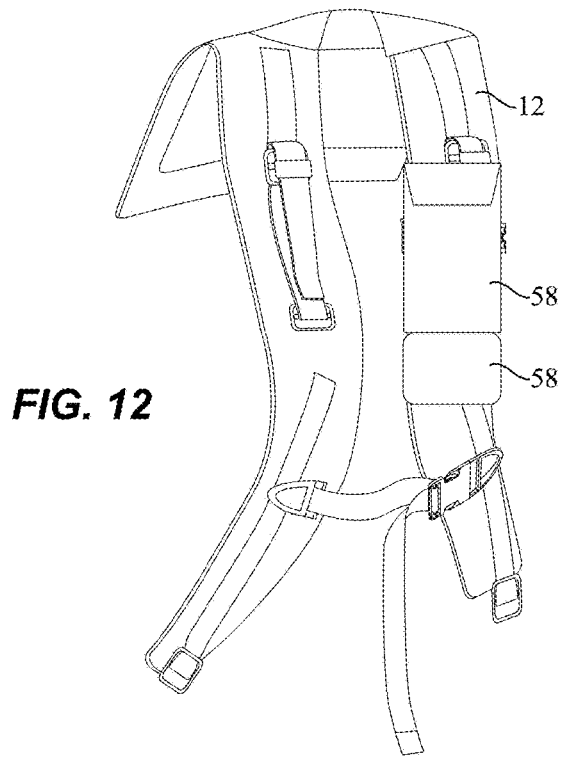

FIG. 12 shows the structure of FIG. 8A but with to auxiliary items connected to the top clip portion by a hook and loop attachment system.

Figure 12A:
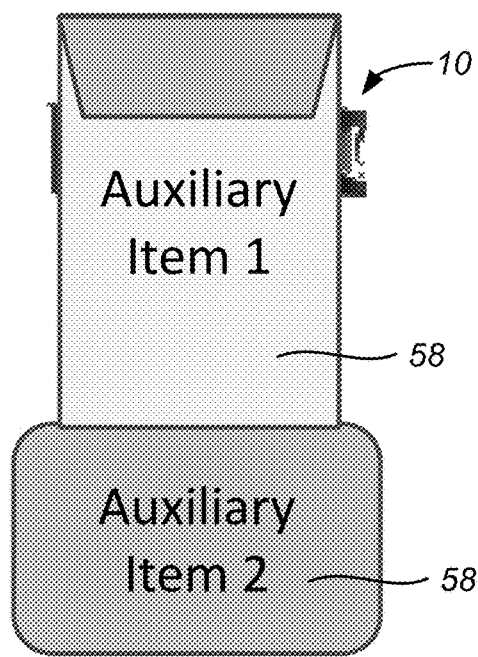

FIG. 12A is an enlarged front view of the structure of FIG. 12.

Figure 12B:
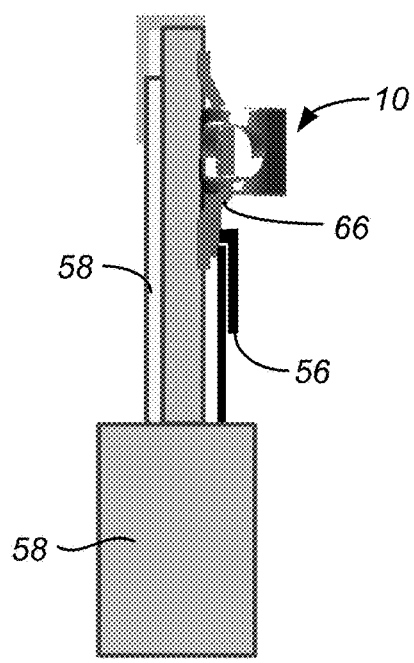

FIG. 12B is a side view of the structure of FIG. 12A with the strap removed for clarity.

Figure 13:
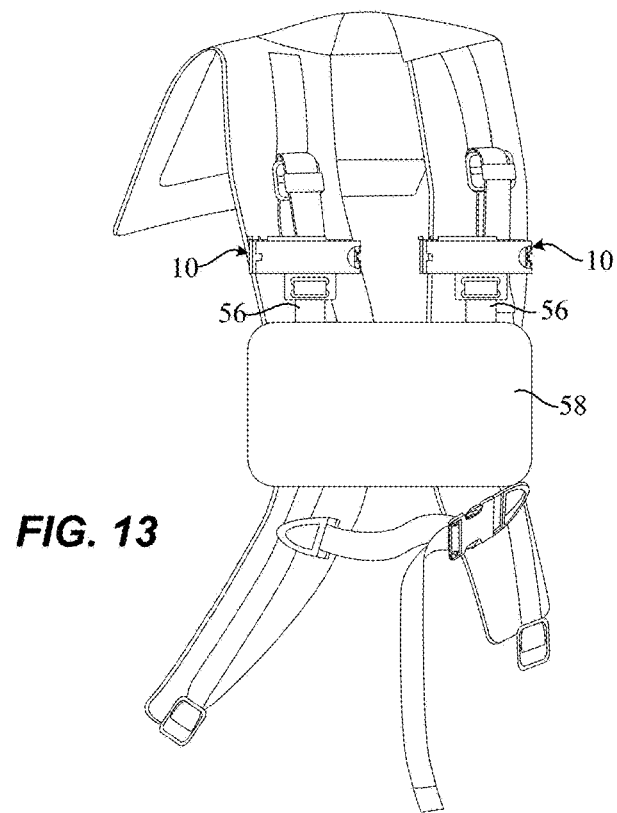

FIG. 13 shows a modification of the structure of FIG. 8A with two clips supporting a single auxiliary item by webbing extending from each clip.

Figure 13A:
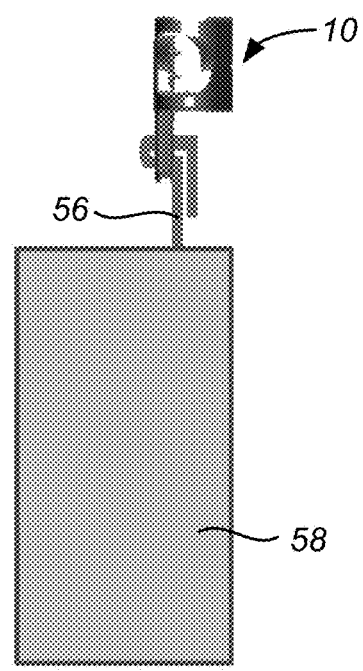

FIG. 13A is an enlarged side view of the structure of FIG. 13 with the strap removed for clarity.

Figure 14:
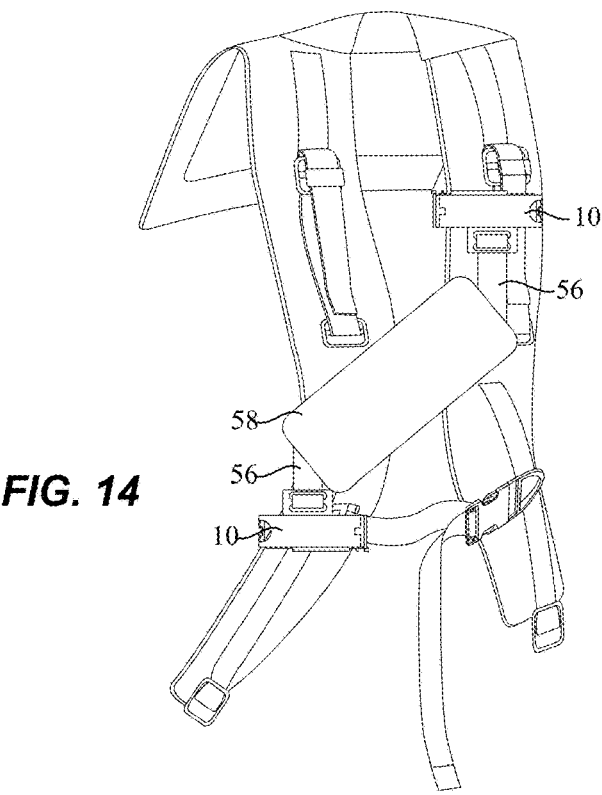

FIG. 14 shows another configuration where two clips may be used together to add a generic weight bearing auxiliary pack to two clips, with the clips being secured to two different shoulder straps at different heights, using webbing between the clips and the auxiliary pack.

Figure 15:
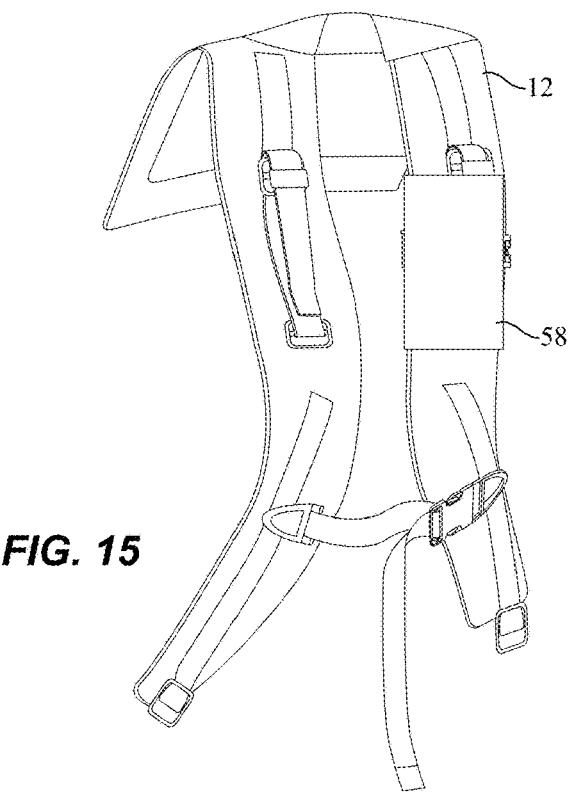
Figure 15A:
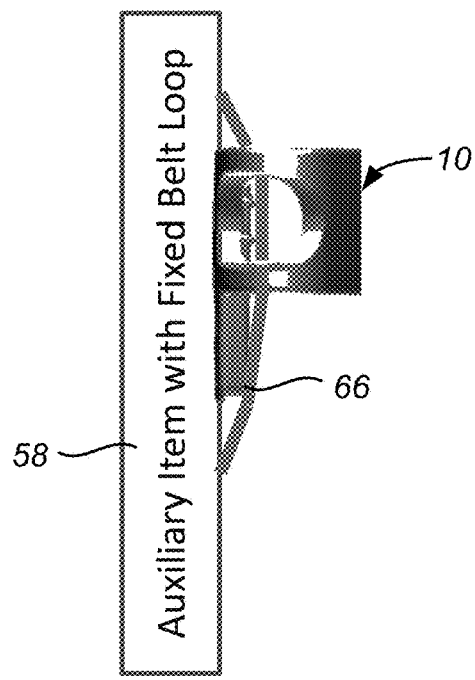

FIGS. 15 and 15A show how the clip may be used to add an existing auxiliary pack typically worn on a belt using a fixed belt loop to a shoulder strap using the clip top portion.

Figure 15B:
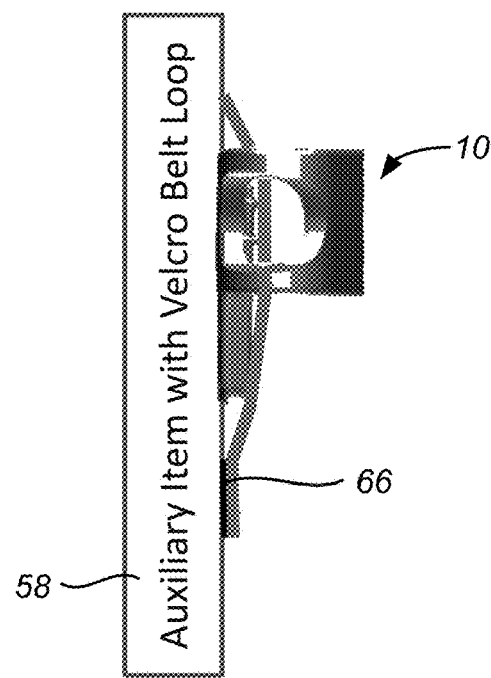

FIG. 15B shows structure similar to FIG. 15A in which the belt loop is not a fixed belt loop but has hook and loop type fasteners.

FIG. 16, FIG. 17, FIG. 18A and FIG. 18B show ways in which an auxiliary item may be connected and secured to the clip top portion by screws, a metal clip and lock arms.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used to attach auxiliary items to a strap system, such as a shoulder strap, and may be comprised of the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

Bottom Portion
Top Portion
Hinge or Flexible Connection
Closure Mechanism including Stabilizer
Teeth to Create Friction The various elements of the device of the present invention may be related in the following exemplary fashions. It is not intended to limit the scope or nature of the relationships between the various elements and the following examples presented are illustrative examples only. Like elements in various examples can be referred to with like reference numerals.

By way of example, and referring to FIGS. 1A-1B, an embodiment of the invention include a clip 10 for attaching auxiliary weight bearing items, such as those discussed below, to a strap 12, see FIGS. 5A and 5B, such as a shoulder strap. In some examples the auxiliary weight bearing item could be supported elsewhere on the person's body, such as by a tool belt worn by the person, but be attached to a lanyard or other item with the lanyard or other item attached to the clip 10; in these examples the auxiliary weight bearing item would be indirectly attached to the clip 10. The clip comprises a bottom portion 14 hinge-ably attached to a top portion 16 by a hinge attachment 22 for pivotal movement about a hinge axis 23. The clip is configured to be in an open position as in FIG. 1B or a closed position as in FIG. 1A. When the clip 10 is in a closed configuration, a stabilizer extension in the form of a securement tooth 18 at the top closure end 20 of the top portion 16 distal from the hinge attachment 22 is configured to engage with a lock groove 24, also referred to as stabilizer groove 24, formed in a locking arm 26 on an end of the bottom portion 14 distal from the hinge attachment 22, defining an interior space 28, see FIG. 1A, configured to accommodate a strap 12. The combination of securement tooth 18 and lock groove 24 constitute a stabilizer 25. Stabilizer 25 helps to prevent the top portion 16 of the clip 10 from slipping vertically when weight is applied to clip. Stabilizer 25 therefore prevents movement generally parallel to the hinge axis 23; what is meant by preventing movement is that small amounts of movement, consistent with the limitations of manufacturing processes and within manufacturing variations, are permitted. The distal end 20 of the top portion 16 may also engage with a locking tooth 30 of a lock arm 26 on the distal end of the bottom portion 14 to help secure the clip 10 in a closed configuration. Distal end 20 and locking tooth 30 act as parts of a closure mechanism for clip 10. A top surface 32 of the top portion 16 and a bottom surface 34 of the bottom portion 14 may together form interior walls in the interior space 28. The interior walls 32, 34 may comprise a plurality of strap-engaging teeth 36, wherein the teeth are configured to penetrate into a strap 12, preventing the clip from sliding, commonly sliding vertically, along the length of the strap. The clip 10 may further comprise an optional spring and/or stop mechanism used to provide an open and/or close bias for the hinge mechanism. The item can be attached to the clip 10 before or after the clip is secured to the strap 12.

FIG. 2 shows another example of clip 10 in a closed position with hook-type fasteners 40 extending from an outer surface 42 of the top portion 16.

By way of another example, and referring to FIGS. 3A-3C and 4, some embodiments of the invention include a clip 10 for attaching an auxiliary weight bearing item to a strap 12, such as a shoulder strap, the clip comprising a single folded material that consists of top portion 16, bottom portion 14 and one or more flexible connections in the form of a living hinge 22 for pivotal movement about a hinge axis 23 in the form of a living hinge axis. Living hinge 22 is made so that the top portion and bottom portion are biased towards a partially open position, see FIGS. 3A-3C, but possible to flex to a more open position as to allow a strap 12 to be placed between the top portion and bottom portion or flexed to one of several closed positions, where an interior space 28, see FIG. 5B, is created by the closure of the top portion and the bottom portion, the interior space configured to accommodate a strap. When the clip 10 is in a closed configuration, a securement tooth/stabilizer extension 18 on an end of the bottom portion distal from the living hinge 22 is configured to engage with a lock/stabilizer groove 24 on an end of the top portion 16 distal from the living hinge, defining an interior space 28 configured to accommodate a strap 12 as shown in FIG. 5B. Stabilizer extension 18 and stabilizer groove 24 constitute a stabilizer 25. As with the example of FIGS. 1A and 1B, the engagement of the stabilizer/securement tooth 18 and stabilizer/lock groove 24 can help prevent the top portion of the clip from slipping vertically when weight is applied to clip. The distal/top closure end 20 of the top portion 16 engages one of a row of locking teeth 30 on locking arm 26 at the distal end of the bottom portion 14 to help secure the clip 10 in one of several closed configurations. A surface 32 of the top portion 16 and a surface 34 of the bottom portion 14 may together form the interior walls in the inner space 28. The interior walls may comprise a plurality of strap-engaging teeth 36, wherein the teeth are configured to penetrate into a strap 12, preventing the clip from sliding vertically along the length of the strap.

The interior walls of the top and bottom portions may comprise a plurality of strap-engaging teeth 36 that are in two rows on the top portion 16 (e.g. six teeth and seven teeth) and two rows on the bottom portion 14 (e.g. six teeth and seven teeth) that are offset from teeth rows on the top portion. When a strap(s) 12 is enclosed within the interior space 28 formed when the clip top portion and bottom portion are in the closed configuration, the plurality of teeth come in contact with the inserted strap(s) and cause significant friction between the inserted strap(s), clip top portion and clip bottom portion wherein the friction prevents the clip from sliding vertically along the length of the strap. This is one embodiment presented for example purposes only. This invention covers all other configurations, as well, depending upon the application.

The plurality of teeth on the clip top portion interior wall may optionally be grouped into several teeth that are raised (e.g. nine teeth as represented in FIG. 5) and others that are even with the clip top portion interior wall (e.g. four teeth as represented in FIG. 5).

Referring to FIG. 7, the plurality of teeth 36 that cause friction between the inserted strap, clip top portion 16 and clip bottom portion 14, may optionally be part of a strap-engaging teeth components 46, 47. Teeth components 46, 47 are pluggable into the interior walls 32, 34 and interchangeable with one another to provide different combinations of friction-creating options depending upon the specific application.

Referring to FIGS. 7A-7C, strap-engaging teeth components 46, 47 comprise a plurality of sharp teeth 48, or less sharp teeth or rounded teeth 49, or offset rectangular raised walls 50, or any other component that causes significant friction between the inserted strap(s), clip top portion and clip bottom portion wherein the friction prevents the clip from sliding vertically along the length of the strap when the clip is in the closed position.

The outer surface of the clip top portion may comprise a fastener configured to attach an auxiliary item thereto. For example, as shown in FIGS. 1A, 1B and 3A-3C, the fastener may be comprised of a slatted protrusion 52, also referred to as a slatted webbing-attachment type fastener or simply slatted fastener, wherein the slats, created by slots 54 formed in slatted protrusion 52, are used to secure webbing 56 from an auxiliary item 58, see FIGS. 8A-8C, resulting in the auxiliary item hanging from the strap. In other embodiments, the fastener may comprise hooks 40, such as those shown in FIG. 2, or any other conventional fastener, such as hook and loop fastener, snap(s), button(s), screw(s), tie(s), clip(s), carabineer(s) or the like.

Referring to FIG. 3B, there may optionally be a raised edge 60 on the inner portion of the top of clip distal to the flexible connection that is located between the clip top portion lock/stabilizer groove 24 and the plurality of strap-engaging teeth 36. This raised edge 60 provides a demarcation so that straps, webbing or the like that are placed within the interior space do not interfere with the lock/stabilizer groove function.

As shown in FIGS. 5A and 5B, the clip can may be fastened around a strap 12 by placing the strap into the clip when it is in the open configuration and compressing the clip about the strap into the closed and locked position, such that the clip top portion is positioned adjacent to a surface of the strap facing away from the user, wherein an auxiliary item 58 is attached to the fastener 52. As a result of the structure of the clip, the added weight from the auxiliary item 58 may be more evenly distributed than with conventional devices. Specifically, the weight may be centered to the strap to optimize strap support. Moreover, the clip of the present disclosure may be used generically with any existing strap or shoulder strap system and positioned anywhere along it providing balance, weight distribution, security and accessibility benefits. Invention may be particularly useful for providing ready access to auxiliary items by persons with mobility problems; in such situations the straps passing over the chest of the user of a strapping or harness system without a backpack component could be used to provide ready access to items while the user is seated. In embodiments, the clip may be configured to support at least 25 pounds or more without slipping along the strap. It also allows the user to carry more items by making the shoulder strap accessible to additional packs.

FIGS. 6A-6C and 9A-18B present exemplary clip invention uses with different fasteners, straps and/or packs. Some of the unique benefits of this invention applied to all exemplaries include making items more accessible by placing them on the front of the body rather than back, making them more securely fastened to the strap so they remain in that fixed position, making items more secure because they are always in sight rather than on your back, freeing the user's hands for other activities since they can place items in an accessible pack rather than hold the item and shifting weight to the front thereby improving weight distribution and potentially posture. This list of exemplary uses is intended to be exemplary only, and it is not intended that this list be used to limit the uses of the present application to just those listed. Persons having ordinary skill in the art relevant to the present disclosure may understand there to be additional uses to which this invention applies.

As discussed above, FIGS. 6A-6C show how the clip invention may be used to add a generic weight bearing auxiliary item 58 in the form of an auxiliary pack 58 to a shoulder strap 12 using the clip fastener element 10 and webbing 56 extending from the auxiliary pack. The auxiliary pack may have many uses, for example, to hold supplies for fishing, hunting, hiking, camping, climbing, boating, work, school, baby, photography, business travel, public safety, emergency and tactical to name a few uses.

FIGS. 8A-8C show how the clip invention 10 may be used to add a generic weight bearing auxiliary pack 58 to a shoulder strap 12 using the clip top portion 16, auxiliary pack and generic securement mechanism of the auxiliary pack to clip top portion. In FIG. 8C strap 12 is not shown for clarity of illustration. Referring to FIG. 5B, when the clip is in the closed locked position, the raised group of teeth 36 on the clip top portion will come in the most contact with the strap while the teeth even with the clip top portion interior wall will come in the most contact with the securement mechanism, thereby providing a secure fit when the clip is in the closed position. The auxiliary pack may have many uses, for example, to hold smartphone (refer to FIGS. 10-10B), water bottle (refer to FIGS. 11-11A), wallet, permits, and supplies for fishing, hunting hiking, camping, climbing, boating, work, school, baby, photography, business travel, public safety, emergency and tactical to name a few uses.

FIGS. 12-12B show how the clip invention 10 may be used to add two generic weight bearing auxiliary packs to a shoulder strap 12 (not shown in FIGS. 12A and 12B) using the clip fastener 52, clip top portion 16, webbing 56, auxiliary packs 58 and generic securement mechanism of the auxiliary pack to clip to top portion 16. The two auxiliary packs may have many uses, for example, to hold smartphone, water bottle, wallet, permits, and supplies for fishing, hunting, hiking, camping, climbing, boating, work, school, baby, photography, business travel, emergency, public safety and tactical to name a few uses.

FIGS. 13, 13A show how two clips 10 may be used together to add a generic weight bearing auxiliary pack 58 to two shoulder straps 12 using two clip fasteners 10 and webbing 56. The two clips are positioned on two parallel shoulder straps at approximately the same position on each of the two shoulder straps. The auxiliary pack is connected to each of the clip fasteners. Benefit of this configuration is ability to support heavier auxiliary weight distributed across two clip inventions, centering the auxiliary pack to the front of the body and shifting more weight from back to front providing better balance and comfort (refer to FIG. 24). The auxiliary pack may have many uses, for example, holding supplies for fishing, hunting, hiking, camping, climbing, boating, work, school, baby, photography, business travel, emergency, public safety and tactical to name a few uses.

FIG. 14 shows another configuration where two clips 10 may be used together to add a generic weight bearing auxiliary pack to a shoulder strap using two clip fasteners, webbing and auxiliary pack. The two clips are positioned on two parallel shoulder straps, one clip at a higher position on one shoulder strap and the second clip at a lower position on the other parallel shoulder strap. The auxiliary pack is connected to each of the clip fasteners and positioned on the body at a diagonal angle. Additional benefit of this configuration is ability to center the auxiliary pack to the front of the body at a more comfortable diagonal angle, depending upon preference. The auxiliary pack may have many uses, for example, holding supplies for fishing, hunting, hiking, camping, climbing, boating, work, school, baby, photography, business travel, emergency, survival, tactical, and military to name a few use types or use categories. Various alternative auxiliary pack embodiments are included based upon the typical, customary, or even specialized equipment or components of a specific use type or category.

FIGS. 15, 15A show how the clip 10 may be used to add an existing auxiliary pack 58 typically worn on a belt using a fixed belt loop 64 to a shoulder strap 12 using the clip top portion 16 and auxiliary pack with fixed belt loop. The auxiliary pack typically worn on a belt may have several benefits if worn on the shoulder strap including comfort, better accessibility, carrying more packs (both on the belt and shoulder strap). Note that in this configuration, the clip fastener may become inaccessible if the fixed belt loop covers the clip fastener. FIG. 15B illustrates an example similar to FIG. 15A but in which the belt loop is not a fixed belt loop but has hook and loop type fastener elements 66 at one end.

Figure 16:
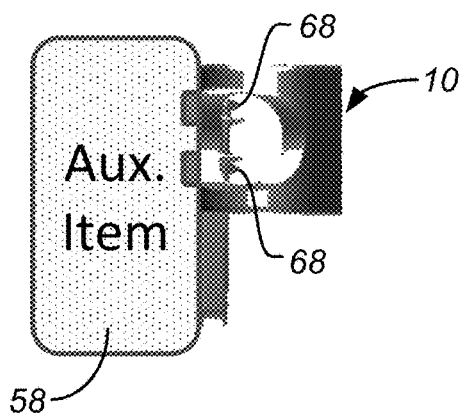
Figure 17:
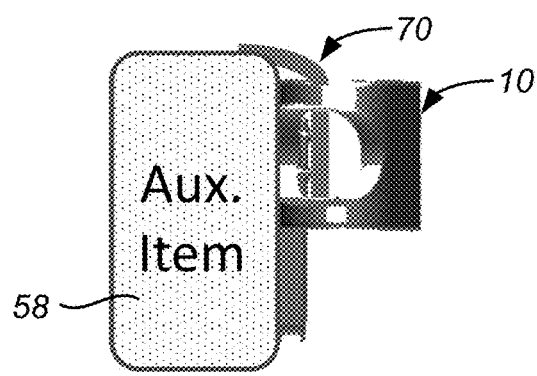
Figure 18A:
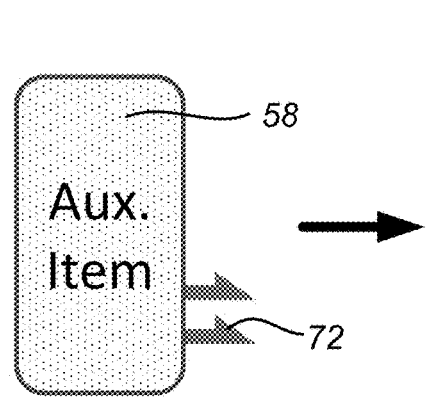
Figure 18B:
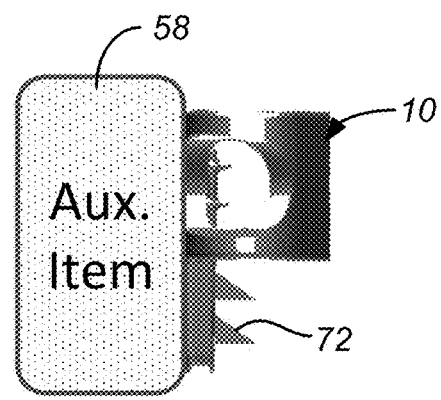

FIGS. 16-18 B show several other examples of ways in which an auxiliary item may be connected and secured to the clip top portion including screws 68, metal clip and lock arms. These are not meant to present a complete list of connection methods but rather to show alternative uses and the flexibility of the clip design. Once connected to the clip top portion, the auxiliary items and clip may be secured to a strap—refer to FIGS. 5A and 5B. Specific uses may include connecting a video camera or light to a shoulder strap.

The clip 10 is designed for use with many types of straps 12. The following list provides some examples of straps for which one or more of the various embodiments of the clip invention applies. It is presented for example only and not meant to be limited to nor all-inclusive of all types of straps for which the clip invention applies: Hiking backpack shoulder straps, fishing backpack or waders shoulder straps, hunting backpack shoulder straps, biking backpack shoulder straps, climbing backpack shoulder straps, messenger bag shoulder strap, sling bag shoulder strap, book bag shoulder straps, baby carrier shoulder straps, purse shoulder straps, personal flotation device shoulder straps, public safety emergency supplies backpack shoulder straps (incl. fireman, police, emergency medical services, etc.), medical supplies shoulder straps, military tactical backpack shoulder straps, sports bag shoulder straps, back support system shoulder straps, luggage backpack shoulder straps, utility worker supplies backpack shoulder straps, traveler/commuter backpack shoulder straps, name a few.

If desired, the components may be reconfigured such that the clip is designed for use with other types of strap-like elements, such as belts, suspenders, ropes, chains, harnesses, metals rods, wood poles, etc., either vertically or horizontally enabling addition of weighted auxiliary items to the elements. Reconfiguration may include making some elements swivel (e.g. fastener), changing the shape of the clip invention without changing the function, making elements expandable and contractible (e.g. changing the length of the clip top and bottom portions to change the size of the space created for straps when the clip is in the closed position). Moreover, the clip may be integrated into other products to create new carrier products, such as new types of front packs, tackle boxes, purses, key/phone holders, tool boxes, tool carriers, baby carriers, water carriers, school supply carriers, book carriers, equipment carriers, hospital patient medical device/monitors carrier and the like.

As discussed in prior paragraphs, the clip is designed to secure auxiliary items to an existing strap. The following lists provide some examples of auxiliary items for which the clip applies for the different shoulder straps presented previously. These lists are presented for example only and not meant to be inclusive of all types of auxiliary items for which the clip invention applies:

Hiking examples—Auxiliary items attached to hiking backpack shoulder straps: (a) small pack for smartphone, wallet, dog items, food snacks, keys, money, permits, maps, glasses, GPS, UHS/VHS radio, smoking supplies and/or the like. (b) small pack for water bottle or drink, (c) small pack containing a tool or knife, (d) a light or camera connected directly to the clip top portion, and (e) a front pack for first aid items, food supplies, clothing, gloves, flashlight and/or the like, (f) a water bladder front pack (g) webbing and clips for camera, binoculars and/or the like, (h) any auxiliary item with belt loop or Molle™ connector, (i) webbing connecting two clips for emergency fix to broken straps.

Fishing examples—Auxiliary items attached to fishing backpack or waders shoulder straps: all hiking examples and (a) small pack for fishing gear such as lures, bait and/or the like, (b) a front pack for tackle, net, fish keeper and/or the like.

Hunting examples—Auxiliary items attached to hunting backpack shoulder straps: all hiking examples and (a) small pack for game skinning/gutting tools, animal caller(s), ammunition and/or the like, (b) a front pack for ammunition, weapons and/or the like.

Biking examples—Auxiliary items attached to biking backpack shoulder straps: all hiking examples and (a) small pack for bicycle repair kit and/or the like.

Climbing examples—Auxiliary items attached to climbing backpack shoulder straps: all hiking examples and (a) small pack for climbing chalk, (b) webbing and loop for carabiners, climbing stoppers and/or the like.

Messenger bag and sling bag examples—Auxiliary items attached to messenger bag shoulder strap: all hiking examples and (a) small pack for packages, business forms, office tools, pager and/or the like.

Book bag examples—Auxiliary items attached to book bag backpack shoulder straps: all hiking examples and (a) small pack for writing devices, calculator and/or the like, (b) a front pack for books, notebooks, homework, computer and/or the like.

Baby carrier examples—Auxiliary items attached to baby carrier backpack or front pack shoulder straps: all hiking examples and (a) small pack for baby wipes, pacifier and/or the like, (b) a front pack for diapers, towels, baby toys and/or the like.

Purse examples—Auxiliary items attached to purse shoulder strap: all hiking examples and (a) small pack for lipstick, lip balm, make-up, mirror and/or the like.

Personal floatation device examples—Auxiliary items attached to personal floatation device shoulder straps: all hiking examples and (a) small pack for flares, locator device and/or the like.

Public safety emergency supplies examples—Auxiliary items attached to public safety emergency supplies backpack shoulder straps: all hiking examples and (a) small pack for protective gloves and glasses, light bar, electronic devices and/or the like, (b) a front pack for blanket, straps, medical supplies, safety vest and/or the like.

Medical supplies examples—Auxiliary items attached to medical supplies backpack shoulder straps: all hiking examples and (a) small pack for protective gloves and glasses, mask and/or the like, (b) a front pack for medicines, medical supplies, and/or the like.

Military tactical examples—Auxiliary items attached to military tactical backpack shoulder straps: all hiking examples and (a) small pack for ammunition, explosive devices, network connector, military radio and/or the like, (b) front pack for ammunition, military tools, weapons and/or the like, (c) webbing and hook for metal detector moving weight off arms to should straps.

Sports examples—Auxiliary items attached to sports/equipment bag or backpack shoulder straps: all hiking examples and (a) small pack for sport glove, scorecard, statistics, notes, protective gear, small items typically hard to find in a sports or equipment bag or backpack, (b) front pack for larger often used sports items and/or the like.

Traveler/commuter examples—Auxiliary items attached to traveler/commuter backpack shoulder straps: all hiking examples and front pack for things needed on a plane, train or while commuting, for example, headphones, electronics for music, computer, tablet, book, notebook, writing supplies, power supplies, smartphone, and/or the like.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A clip for attaching an item to a strap worn by a person, the clip comprising:
    a body comprising a bottom portion having a bottom hinge end and a bottom closure end, a top portion having a top hinge end and a top closure end, and a hinge portion at the bottom and top hinge ends hingedly connecting the top and bottom portions for movement of the top and bottom portions about a hinge axis, wherein the clip is placeable in a closed position with the top and bottom portions directly opposite one another, and in an open position with the top portion extending away from the bottom portion;
    the bottom portion having a bottom surface and the top portion having a top surface positioned opposite the bottom surface when the clip is in the closed position;
    at least one of the top and bottom surfaces comprising strap-engaging, non-slip structure;
    the top and bottom surfaces defining an interior space when the clip is in the closed position, the interior space configured to accommodate a user-wearable strap positionable between the bottom and top surfaces when the clip is in the closed position with the strap-engaging, non-slip structure engageable with the strap so that the clip is securable to the strap by the engagement of the strap-engaging, non-slip structure; and
    a closure mechanism configured to secure the top portion to the bottom portion when the clip is in the closed position, the closure mechanism including:
        a first closure portion carried by the bottom portion and including a locking arm that extends from the bottom closure end away from the bottom surface, wherein the locking arm includes a plurality of rows of locking arm teeth extending from the locking arm towards the bottom hinge end, and each row of locking arm teeth includes a tooth engagement surface facing the bottom surface of the bottom portion,
        a second closure portion carried by the top portion and including a tooth engagement edge at the top closure end configured to engage with the tooth engagement surface of at least one of the rows of locking arm teeth, and
        a stabilizer including (i) a stabilizer groove formed in a distal end of the top portion of the body and (ii) a securement tooth rail formed to orthogonally extend across all of the rows of locking arm teeth, such that, when the clip is in the closed position, the stabilizer groove is secured by the securement tooth rail, regardless of which row of the locking arm teeth is engaged by the tooth engagement edge of the first closure portion, so as to prevent movement generally parallel to the hinge axis of the top portion relative to the bottom portion.

2. The clip according to claim 1, wherein the hinge axis is a fixed position hinge axis.

3. The clip according to claim 1, wherein the hinge portion comprises a living hinge and the hinge axis is a living hinge axis defined by the living hinge.

4. The clip according to claim 1, further comprising a fastener supported by the body, the fastener configured for attachment of the item to the clip.

5. The clip according to claim 4 wherein the fastener is configured for attachment of a weight bearing item to the clip.

6. The clip according to claim 4, wherein the fastener comprises a slotted webbing-attachment type fastener extending vertically from a chosen one of the top and bottom portions.

7. The clip according to claim 4, wherein the fastener comprises a hook-type fastener extending from the top portion.

8. The clip according to claim 1, wherein the strap-engaging, non-slip structure comprises at least one tooth.

9. The clip according claim 1, wherein the strap-engaging, non-slip structure comprises a plurality of teeth.

10. The clip according to claim 9, wherein the plurality of teeth are on both of the top and bottom surfaces.

11. The clip according to claim 9, wherein the plurality of teeth comprises first and second rows of teeth on at least one of the top and bottom surfaces.

12. The clip according to claim 9, wherein the plurality of teeth are removably mountable to at least one of the top and bottom surfaces.

13. The clip according claim 1, wherein;
the first closure portion comprises a locking arm, extending from the bottom closure end away from the bottom surface; and
the body and the locking arm and the closure mechanism are constructed of a one piece, continuous length of material.

14. The clip according to claim 13, wherein the hinge portion is a living hinge constructed of a material resiliently connecting the top and bottom portions, the living hinge being a relaxed state in the open position.

15. The clip according to claim 1, wherein:
the bottom portion has an outer surface; and further comprising:
a cushion material attached to the outer surface of the bottom portion for enhanced comfort.

16. The clip according to claim 1, wherein the top portion comprises a raised edge extending from the top surface at the top closure end, the raised edge extending parallel to the hinge axis.

17. A method for attaching an item to a strap to be worn by a person, the method comprising:
positioning the strap between the top and bottom portions of the clip of claim 1;
placing the clip in the closed position so that the strap-engaging, non-slip structure engages the strap and the closure mechanism secures the bottom and top portions to one another;
securing the item to the clip; and
wearing the strap by a person with the item secured to the clip so that the item is at least partially supported by the strap through the clip.

18. The method according to claim 17, wherein the securing step comprises securing the item to a fastener supported by the body, the fastener configured for attachment of the item thereto.

19. The method according to claim 18, wherein the securing step comprises securing webbing extending from a weight bearing item to a slotted webbing-attachment type fastener extending from a chosen one of the top and bottom portions.

20. The method according to claim 18, wherein the securing step comprises securing the item to a hook of a hook-type fastener extending from the top portion.

21. The method according to claim 17, wherein the positioning step comprises accessing a shoulder strap extendable over the chest of a user.

22. A method for attaching a weight bearing item to first and second straps to be worn by a person, the method comprising:
positioning the first strap between the top and bottom portions of a first clip of claim 1;
placing the first clip in the closed position so that the strap-engaging, non-slip structure engage the first strap and the closure mechanism secures the bottom and top portions to one another;
securing the weight bearing item to the first clip;
positioning the second strap between the top and bottom portions of a second clip of claim 1;
placing the second clip in the closed position so that the strap-engaging, non-slip structure engages the second strap and the closure mechanism secures the bottom and top portions to one another;
securing the weight bearing item to the second clip; and
wearing the first and second straps by a person with the weight bearing item secured to the first and second clips;
whereby the weight bearing item is at least partially supported by the first and second straps through the first and second clips.

23. A clip having a closed position and an open position, the clip comprising:
a body comprising (i) a bottom portion having a bottom hinge end, a bottom closure end, and a bottom surface, (ii) a top portion having a top hinge end, a top closure end and a top surface positioned opposite the bottom surface when the clip is in the closed position, and (iii) a hinge portion at the bottom and top hinge ends hingedly connecting the top and bottom portions;
a strap-engaging, non-slip structure located on at least one of the top surfaces and the bottom surfaces;
an interior space defined by the top and bottom surfaces when the clip is in the closed position, the interior space being configured to accommodate a user-wearable strap positionable between the bottom and top surfaces with the strap-engaging, non-slip structure; and
a closure mechanism configured to secure the top portion to the bottom portion when the clip is in the closed position, the closure mechanism including:
a first closure portion carried by the bottom portion and including a locking arm that extends from the bottom closure end away from the bottom surface, wherein the locking arm includes a plurality of rows of locking arm teeth extending from the locking arm towards the bottom hinge end, and each row of locking arm teeth includes a tooth engagement surface facing the bottom surface of the bottom portion,
a second closure portion carried by the top portion and including a tooth engagement edge at the top closure end configured to engage with the tooth engagement surface of at least one of the rows of locking arm teeth, and
a stabilizer including (i) a stabilizer groove formed in a distal end of the top portion of the body and (ii) a securement tooth rail formed to orthogonally extend across all of the rows of locking arm teeth, such that, when the clip is in the closed position, the stabilizer groove is secured by the securement tooth rail, regardless of which row of the locking arm teeth is engaged by the tooth engagement edge of the first closure portion, so as to prevent movement generally parallel to a hinge axis of the top portion relative to the bottom portion.

* * * * *